US009030309B2

(12) United States Patent
Grost et al.

(10) Patent No.: US 9,030,309 B2
(45) Date of Patent: May 12, 2015

(54) SYSTEM FOR MONITORING ITEMS IN PROXIMITY TO A VEHICLE

(75) Inventors: Timothy J. Grost, Clarkston, MI (US); Matthew M. Highstrom, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 13/205,213

(22) Filed: Aug. 8, 2011

(65) Prior Publication Data

US 2013/0038432 A1 Feb. 14, 2013

(51) Int. Cl.
*B60Q 1/00* (2006.01)
*G08B 13/14* (2006.01)
*G08B 21/02* (2006.01)

(52) U.S. Cl.
CPC ........ *G08B 13/1427* (2013.01); *G08B 21/0227* (2013.01); *G08B 21/0275* (2013.01)

(58) Field of Classification Search
CPC ........... G08B 13/1427; G08B 21/0227; G08B 21/0275
USPC ........... 340/459, 572.1, 988, 425.5, 455, 545, 340/546–549; 700/215
See application file for complete search history.

(56) References Cited

U.S. PATENT DOCUMENTS

2003/0220711 A1* 11/2003 Allen ............................ 700/215
2005/0134459 A1* 6/2005 Glick et al. ................ 340/572.1
2006/0071766 A1* 4/2006 O'Brien et al. ............... 340/442
2009/0015410 A1* 1/2009 Puzio et al. ................ 340/572.1
2009/0096599 A1* 4/2009 Kranz ........................... 340/459
2009/0267757 A1* 10/2009 Nguyen ................... 340/539.11
2010/0102993 A1* 4/2010 Johnson ........................ 340/988
2010/0271192 A1* 10/2010 Mituta .......................... 340/455
2011/0084807 A1* 4/2011 Logan et al. ................. 340/10.1
2011/0279273 A1* 11/2011 Warren ...................... 340/572.1

FOREIGN PATENT DOCUMENTS

CN 101681454 A 3/2010

OTHER PUBLICATIONS

Chinese Office Action for Application No. 201210280197.X Mailed Dec. 1, 2014, 14 pages.

* cited by examiner

*Primary Examiner* — Benjamin C Lee
*Assistant Examiner* — Chico A Foxx
(74) *Attorney, Agent, or Firm* — Cantor Colburn LLP

(57) ABSTRACT

A vehicle having an item detection system is provided having at least one indicator for selectively emitting an alarm when activated, a vehicle alarm control module, at least one radio frequency identification ("RFID") tag, and a radio frequency ("RF") interrogator. The vehicle alarm control module is in communication with the at least one indicator and includes control logic for sending an activation data signal to the at least one indicator to selectively activate the at least one indicator. The RFID tag is configured for receiving a query RF signal and transmitting a reply RF signal upon receipt of the query RF signal. The RF interrogator is in communication with the vehicle alarm and is located within a specified distance of the RFID tag. The RF interrogator has a processor, and includes control logic for transmitting the query RF signal to the RFID tag.

17 Claims, 2 Drawing Sheets

SYSTEM FOR MONITORING ITEMS IN PROXIMITY TO A VEHICLE

FIELD OF THE INVENTION

Exemplary embodiments of the invention relate to an item detection system, and, more particularly, to an item detection system for a vehicle having a radio frequency ("RF") interrogator monitoring at least one radio frequency identification ("RFID") tag.

BACKGROUND

Relatively large items such as, for example, a bicycle or a canoe are usually too large to fit within the passenger compartment or the trunk of a vehicle. Therefore, if an individual wants to transport a relatively large item using his or her vehicle, the item is typically secured to the vehicle's exterior. Several different approaches currently exist for securing large items to the vehicle's exterior. For example, in one approach devices that secure and conceal large items may be used such as, for example, lock boxes, car-top carriers, and truck bed covers. While large items tend to stay relatively secure and are concealed using these devices, it is still possible for a thief to break into or tamper with these devices and remove the large items.

In another approach, large items are strapped to the roof or to a trunk rack of a vehicle. For example, a bicycle carrier may be provided on top of the vehicle for securing a bicycle to the vehicle. Chains and locks may also be used as well to secure large items to the exterior of the vehicle. However, securing large items to the roof or trunk rack of the vehicle leaves the large item in plain sight. This tends to attract the attention of thieves. In particular, an item left in plain sight that has significant value may be especially tempting to a thief.

In some instances even a smaller item such as, for example, a smartphone or a laptop computer, may be stolen from the passenger compartment of the vehicle as well. For example, if a driver leaves his or her cellular telephone in a convertible, and leaves the retractable roof of the convertible open, a thief may be able to easily steal the telephone without being detected. Accordingly, there exists a need for a system that provides notification in the event items are removed from the proximity of the vehicle.

SUMMARY OF THE INVENTION

In one exemplary embodiment of the invention, a vehicle having an item detection system is provided including at least one indicator for selectively emitting an alarm when activated, a vehicle alarm control module, at least one radio frequency identification ("RFID") tag, and a radio frequency ("RF") interrogator. The vehicle alarm control module is in communication with the at least one indicator and includes control logic for sending an activation data signal to the at least one indicator to selectively activate the at least one indicator. The RFID tag is configured for receiving a query RF signal and transmitting a reply RF signal upon receipt of the query RF signal. The RF interrogator is in communication with the vehicle alarm and is located within a specified distance of the RFID tag. The RF interrogator has a processor, and includes control logic for transmitting the query RF signal to the RFID tag. The RF interrogator includes control logic for monitoring the RFID tag for the reply RF signal. The RF interrogator also includes control logic for determining if the RFID tag is moved out of range of the specified distance. The RFID interrogator will not receive the reply RF signal from the RFID tag if the RFID tag is moved out of range of the specified distance. The RF interrogator further includes control logic for sending a trigger data signal to the vehicle alarm control module for activating the at least one indicator if the RFID tag is moved out of range of the specified distance.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
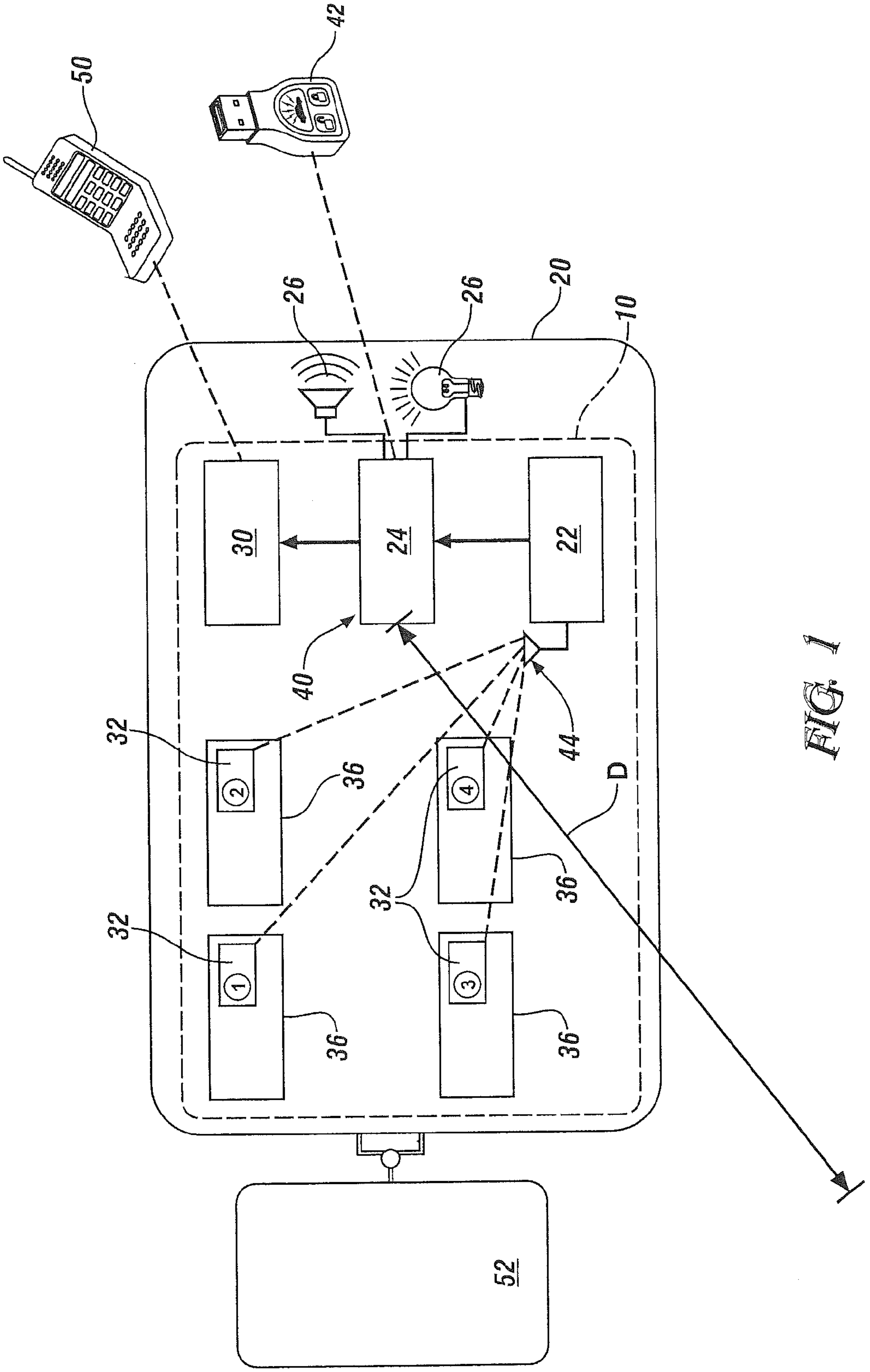
FIG. 1 is a schematic diagram of an exemplary item detection system in a vehicle.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an item detection system 10 employed in a vehicle 20. The item detection system 10 includes a radio frequency ("RF") tag reader or interrogator 22, a vehicle alarm control module 24, at least one indicator 26, a wireless communication device 30, and at least one radio frequency identification ("RFID") tag 32. In the embodiment as shown, multiple RFID tags 32 are shown, where each RFID tag 32 is associated with a personal item 36. In one embodiment, the personal item 36 is too large to be able to fit within the passenger compartment or the trunk (not shown) of the vehicle 20. The personal item 36 may be, for example, a bicycle or a canoe. The personal items 36 are typically strapped to a roof or to a trunk rack (not shown) of the vehicle 20. Alternatively, if the vehicle 20 is a truck, the personal items 36 may be stored in a truck bed (not shown). However, it is to be understood that the RFID tags 32 may be associated with personal items of any type or size as well, and that the personal item 36 may be any type of item possible. For example, in another embodiment the personal item 36 may be a relatively small item such as, for example, a smartphone or a laptop that is stored within the passenger compartment of the vehicle 20. In one embodiment, the RFID tags 32 are removable tags that may be temporarily secured to a surface of the personal item 36 by any type of securement approach such as, for example, adhesive or Velcro®. Alternatively, in another embodiment the RFID tags 32 are permanently attached to or embedded within the personal item 36.

The vehicle alarm control module 24 and the indicators 26 are part of a vehicle security system 40. The vehicle alarm control module 24 is in communication with the alarm indictors 26. The vehicle alarm control module 24 includes control logic for sending an activation data signal to the indicators 26 to selectively activate the indicators 26. In the embodiment as illustrated in FIG. 1, the indicators 26 are a horn and a vehicle light, however it is to be understood that other types of indicators may be used as well. The vehicle security system 40 typically emits a high-volume sound as well as flashing the vehicle's lights when a triggering event, such as an attempted break-in or tampering of the vehicle 20, is detected. The vehicle alarm control module 24 is in communication with one or more sensors (not shown) that detect tampering with the vehicle 20. Some types of sensors that may be used for monitoring the vehicle 20 include, for example, motion and impact sensors.

The vehicle security system 40 typically receives an activation signal. Once the activation signal is received, the vehicle control module 24 enters a monitoring state and monitors the sensors (not shown) within the vehicle 20 for tampering. The vehicle security system 40 may be activated as a user exits the vehicle 20 by a remote device such as, for example, a key fob 42 that is in wireless communication with the vehicle alarm control module 24. In the event that one of the sensors (not shown) detects tampering, the vehicle alarm control module 24 activates at least one of the indicators 26. For example, in one embodiment if the vehicle alarm control module 24 detects tampering, a horn may be activated to emit a honking noise.

The RF interrogator 22 includes an antenna 44, a processor (not shown) and a memory (not shown). The RF interrogator 22 is in wireless communication with each of the RFID tags 32 through the antenna 44. The RF interrogator 22 is also in communication to send and receive data signals from the vehicle alarm control module 24. Specifically, the RF interrogator 22 is in communication with each of the RFID tags 32 that are located within a specified distance D of the RF interrogator 22. The specified distance D represents an area or region of close proximity around the vehicle 20. In one embodiment, the specified distance D may also include items that are stored in a trailer or other type of cargo carrying device 52 pulled by the vehicle 20.

The RF interrogator 22 includes control logic for transmitting an RF signal, which may be referred to as a query signal. The query signal is received by each of the RFID tags 32 that are located within the specified distance D. Upon receipt of the of query signal, the RFID tags 32 are configured for transmitting a reply signal back to the RF interrogator 22. The RF interrogator 22 includes control logic for monitoring each of the RFID tags 32 for the reply signal. In one embodiment, the RF interrogator 22 is programmed to poll one of more RFID tags 32 at a specific time intervals for the reply signal. For example, in one embodiment the RF interrogator 22 polls the RFID tags 32 every ten seconds.

Each of the RFID tags 32 may contain information associated with the corresponding personal item 36. In the event one or more of the RFID tags 32 are not located within the specified distance D, then the RF interrogator 22 does not receive the reply signal. Thus, if one or more of the personal items 36 are removed from close proximity of the vehicle 20, then the RF interrogator 22 will not receive the reply signal from the RFID tag 32. In the event that the RF interrogator 22 does not receive the reply signal, then the RF interrogator 22 includes control logic for sending a trigger data signal to the vehicle alarm control module 24 for activating at least one of the indicators 26. That is, in the event that the RF interrogator 22 detects that at least one of the RFID tags 32 has been moved outside the area of close proximity around the vehicle 20, the RF interrogator 22 includes control logic for activating the vehicle security system 40.

In one embodiment, when the vehicle security system 40 is activated by a device such as the key fob 42, the vehicle alarm control module 24 sends a data signal to the RF interrogator 22 to begin polling each of the RFID tags 32. Alternatively, in another embodiment the RF interrogator 22 is activated independently of the vehicle security system 40. The RF interrogator 22 may include control logic for initializing a learn mode. The learn mode determines which specific personal items 36 located within the distance D of the RF interrogator 22 need to be monitored. Specifically, once the RF interrogator 22 is activated, the RF interrogator 22 includes control logic for sending an initialization query RF signal to each RFID tag 32. The initialization query RF signal represents the first RF signal that is sent to the RFID tags 32 after the RF interrogator 22 is activated. The RF interrogator 22 also includes control logic for monitoring each RFID tag 32 for an initialization reply RF signal. Receipt of the initialization reply signal by the RF interrogator 22 confirms that the RFID tag 32 is within the specified distance D of the RF interrogator 22. Therefore, in the embodiment as illustrated in FIG. 1, if the RFID tags labeled '1' and '2' send back the initialization reply signal to the RF interrogator 22, then the RF interrogator 22 includes control logic for storing the values of RFID tags '1' and '2' in the memory of the RFID interrogator 22. The RF interrogator 22 includes control logic for then polling only RFID tags '1' and '2' to determine if the personal items 36 associated with RFID tags '1' and '2' are moved out of close proximity of the vehicle 20. Likewise, if the RFID tags labeled as '3' and '4' fail to send back the initialization reply signal to the RF interrogator 22 (i.e. in the event that RFID tags '3' and '4' are not located within distance D), then the RF interrogator 22 will not poll RFID tags '3' and '4'.

In one embodiment, the RF interrogator 22 may also include control logic for only activating the vehicle security system 40 in the event only a portion of the RFID tags 32 or only a selected RFID tag 32 is moved from close proximity of the vehicle 20. Continuing to refer to FIG. 1, in one embodiment RFID tags '1' and '2' may represent activated tags, while the remaining RFID tags '3' and '4' are deactivated. Thus, the RF interrogator 22 will only send the trigger data signal to the vehicle alarm control module 24 for activating at least one of the indicators 26 in the event RFID tags '1' or '2' are moved outside of the specified distance D. That is, if the RFID tags '3' and '4' are moved outside of the specified distance D, then the RF interrogator 22 will not send the trigger data signal to the vehicle alarm control module 24 to activate at least one of the indicators 26.

The vehicle alarm control module 24 is also in communication with the wireless communication device 30. The wireless communication device 30 is typically any type of communication device that may be placed in wireless communication with at least one personal electronic device 50, and is capable of sending notifications to the personal electronic device 50. In one embodiment, the notification may be in the form of a text message such as, for example, Short Message Service ("SMS") messages. Alternatively, the notification may be in the form of a recorded voice call. For example, the wireless communication device 30 may include circuitry for making a telephone call over a cellular network. In another embodiment, the wireless communication device 30 is a telematics control module that is in communication with an Internet cloud (not shown), where the Internet cloud is in wireless communication with the personal electronic device 50.

The wireless communication between the wireless communication device 30 and the personal electronic device 50 may be a short-range wireless connection such as a Bluetooth® signal conforming to IEEE Standard 802.15 or a Wi-Fi® signal conforming to IEEE standard 802.11. Alternatively, the wireless communication may be a cellular signal as well. The personal electronic device 50 is any type of device having at least one of voice call capability and text communication service capabilities. In one embodiment, the personal electronic device 50 is a smartphone.

The vehicle alarm control module 24 includes control logic for sending an indicator data signal to the wireless communication device 30 indicating that at least one of the RFID tags 32 have been moved out of range of the specified distance D. Upon receipt of the indicator data signal, the wireless communication device 30 then sends a message to the personal electronic device 50 indicating that one or more of the RFID tags 32 have been moved. For example, in one embodiment, the wireless communication device 30 sends a text message to the personal electronic device 50 that states "Item 1 has been removed from the vicinity of your vehicle" in the event that the RFID tag '1' is removed from the vehicle 20. In another embodiment, the wireless communication device 30 could make a recorded telephone call to the personal electronic device 50 stating that one of more of the RFID tags 32 have been removed. Thus, if one or more of the personal items 36 are removed from close proximity of the vehicle 20, then the vehicle alarm control module 24 sends the indicator data signal to the wireless communication device 30 to notify the personal electronic device 50 of the missing personal item 36.

In one embodiment, a user may have the option to configure the settings of the item detection system 10 such that only the indicators 26 are activated in the event at least one of the RFID tags 32 have been moved out of range of the specified distance D. For example, in one embodiment, the vehicle alarm control module 24 includes control logic for activating either a horn, a vehicle light, or both in the event at least one of the RFID tags 32 are moved out of range of the specified distance D. Alternatively, in another embodiment, the vehicle alarm control module 24 may be configured such that only a data signal is sent to the wireless communication device 30 for sending a text message or telephone call to the personal electronic device 50, and the indicators 26 are not activated at all. In yet another embodiment, in the event at least one of the RFID tags 32 have been moved out of range of the specified distance D the vehicle alarm control module 24 includes control logic for activating the indicators 26 as well as sending a text message or telephone call to the personal electronic device 50. Thus, in the event a thief removes one or more personal items 36 from the vehicle 20, or in the proximity of the vehicle 20, the item detection system 10 may activate the indicators 26 and send a notification to the personal electronic device 50.

Figure 2:
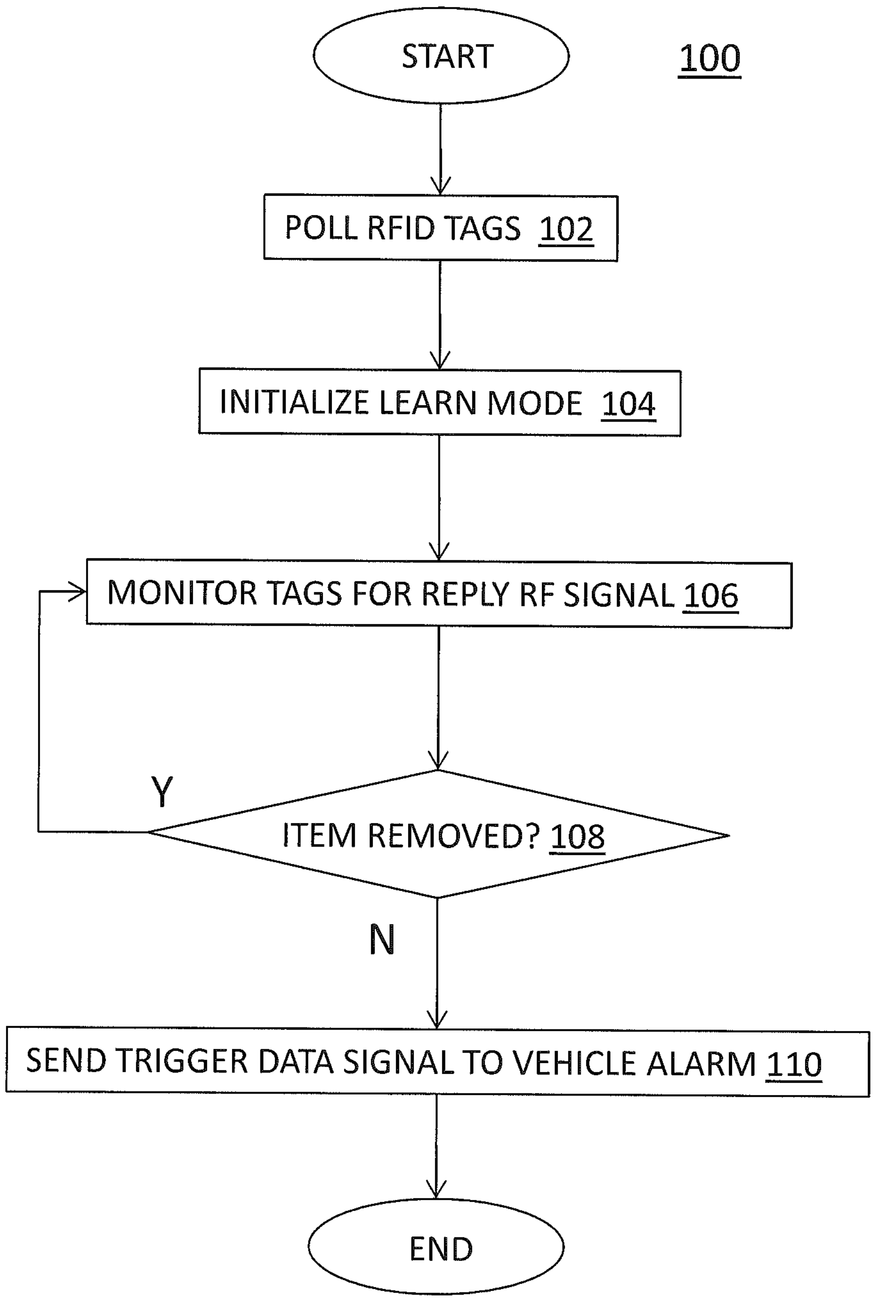
FIG. 2 is a process flow diagram illustrating a method for operating the item detection system shown in FIG. 1.

A method of operating the item detection system 10 will now be explained. Referring to FIGS. 1-2, an exemplary process flow diagram illustrating an exemplary process of operating the item detection system 10 is generally indicated by reference number 100 in FIG. 2. Process 100 begins at step 102, where the item detection system 10 is activated, and an RF interrogator 22 polls each of the RFID tags 32. Referring to both FIGS. 1-2, in one embodiment, the RF interrogator 22 is activated concurrently with the vehicle security system 40 by a device such as a key fob 42. Alternatively, in another embodiment the RF interrogator 22 is activated independently of the vehicle security system 40. Process 100 may then proceed to step 104.

In step 104, the RF interrogator 22 may include control logic for initializing a learn mode. The learn mode determines which specific personal items 36 are located within a distance D of the RF interrogator 22 that need to be monitored. Specifically, once the RF interrogator 22 is activated in step 102, the RF interrogator 22 includes control logic for sending an initialization query RF signal to each RFID tag 32. The initialization query RF signal represents the first RF signal that is sent to the RFID tags 32 after the RF interrogator 22 is activated. The RF interrogator 22 also includes control logic for monitoring each RFID tag 32 for an initialization reply RF signal. Receipt of the initialization reply signal by the RF interrogator 22 confirms that the RFID tag 32 is within the specified distance D of the RF interrogator 22. Process 100 may then proceed to step 106.

In step 106, the RF interrogator 22 includes control logic for monitoring each RFID tag 32 for the reply RF signal. In one embodiment, the RF interrogator 22 includes control logic for monitoring each of the RFID tags 32 that have sent an initialization reply RF signal back to the RF interrogator 22. Process 100 may then proceed to step 108.

In step 108, the RF interrogator 22 continues to monitor each RFID tag 32 until, and determines if a personal item 36 is removed from the vehicle 20. In the event the RF interrogator 22 fails to receive the reply RF signal from at least one of the RFID tags 32, then process 100 proceeds to step 110. In the event that the RF interrogator 22 receives the reply signal from each RFID tag 32, then process 100 returns to step 106, where each RFID tag 32 continues to be monitored.

In step 110, the RF interrogator 22 includes control logic for sending a trigger data signal to a vehicle alarm control module 24 indicating that at least one RFID tag 32 is moved out of range of the specified distance D. The vehicle alarm control module 24 includes control logic for activating at least one indicator 26 in the event at least one of the RFID tags 32 are moved out of range of the specified distance D. Alternatively, in another embodiment, the vehicle alarm control module 24 may be configured such that only an indicator data signal is sent to a wireless communication device 30 for sending a text message or telephone call to a personal electronic device 50, and the indicators 26 are not activated at all. In yet another embodiment, in the event at least one of the RFID tags 32 have been moved out of range of the specified distance D the vehicle alarm control module 24 includes control logic for activating the indicators 26 as well as sending a text message or telephone call to the personal electronic device 50. Process 100 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle having an item detection system, comprising:

at least one vehicle-embedded indicator for selectively emitting an alarm when activated;

a vehicle alarm control module that is in communication with the at least one vehicle-embedded indicator, the vehicle alarm control module including control logic for sending an activation data signal to the at least one vehicle-embedded indicator to selectively activate the at least one vehicle-embedded indicator;

at least one radio frequency identification ("RFID") tag that is associated with a personal item, the at least one RFID tag configured for receiving a query RF signal and transmitting a reply RF signal upon receipt of the query RF signal;

a radio frequency ("RF") interrogator in communication with the vehicle alarm control module and located within a specified distance of the at least one RFID tag, the RF interrogator having a processor;

a user interface comprising control logic that provides user-configurable settings, the user-configurable settings specifying corresponding functions to perform when the at least one RFID tag is outside of a range of the specified distance, the control logic of the user interface receiving one or more selections, via the settings, from a user;

wherein the RF interrogator is selectively activated, independent from an activation of a vehicle security system, through a function of a key fob, wherein the vehicle security system is actuatable by the key fob and comprises the vehicle control module and the at least one vehicle-embedded indicator, the RF interrogator comprising:

a control logic for transmitting the query RF signal to the at least one RFID tag;

a control logic for monitoring the at least one RFID tag for the reply RF signal;

a control logic for determining if the at least one RFID tag is moved out of the range of the specified distance; and a control logic for performing the one of the functions, based on the one or more user selections, upon determining the at least one RFID tag is moved out of the range of the specified distance, the functions including sending a trigger data signal to the vehicle alarm control module for activating the at least one indicator, sending a data signal configured to initiate a text message notification directed to a personal electronic device of the user, sending a data signal configured to initiate a recorded voice message directed to the personal electronic device of the user, and sending the trigger data signal and at least one of the data signals.

2. The vehicle of claim 1, wherein the item detection system comprises a wireless communication device in communication with the vehicle alarm control module, wherein the wireless communication device is in selective wireless communication with the personal electronic device.

3. The vehicle of claim 2, wherein the selective wireless communication is based on one of the IEEE 802.15 standard, the IEEE 802.11 standard, and cellular signals.

4. The vehicle of claim 2, wherein the vehicle alarm control module includes control logic for sending an indicator data signal to the wireless communication device indicating if the at least one RFID tag is moved out of range of the specified distance.

5. The vehicle of claim 2, wherein the wireless communication device is a telematics control module.

6. The vehicle of claim 1, comprising a plurality of RFID tags, wherein a portion of the plurality of RFID tags are activated and a remainder of the plurality of RFID tags are deactivated.

7. The vehicle of claim 6, wherein the RF interrogator includes control logic for sending the trigger data signal to the vehicle alarm control module to activate the at least one vehicle-embedded indicator in the event at least one of the plurality of RFID tags that is activated is moved out of range of the specified distance, and wherein the RF interrogator includes control logic for not sending the trigger data signal to the vehicle alarm control module in the event at least one of the plurality of RFID tags that is deactivated is moved out of range of the specified distance.

8. The vehicle of claim 1, wherein the RF interrogator includes control logic for sending an initialization query RF signal to the at least one RFID tag and a control logic for monitoring the at least one RFID tag for an initialization reply RF signal, wherein the initialization query RF signal represents the first RF signal sent to the at least one RFID tag, and wherein receipt of the initialization reply signal confirms that the at least one RFID tag is within the specified distance of the RF interrogator.

9. The vehicle of claim 1, wherein the personal item is sized such that the personal item is unable to fit within a passenger compartment and a trunk of the vehicle.

10. The vehicle of claim 1, wherein the vehicle-embedded indicator comprises at least one of a vehicle horn and vehicle lights.

11. A vehicle having an item detection system comprising:

a wireless communication device in selective wireless communication with a personal electronic device;

at least one radio frequency identification ("RFID") tag that is associated with a personal item, the at least one RFID tag configured for receiving a query RF signal and transmitting a reply RF signal upon receipt of the query RF signal;

at least one vehicle-embedded indicator for selectively emitting an alarm when activated;

a vehicle alarm control module that is in communication with the at least one vehicle-embedded indicator and the wireless communication device, the vehicle alarm control module including control logic for sending an activation data signal to the at least one vehicle-embedded indicator to selectively activate the at least one indicator;

a radio frequency ("RF") interrogator in communication with the vehicle alarm and located within a specified distance of the at least one RFID tag, the RF interrogator having a processor;

a user interface comprising control logic that provides user-configurable settings, the user-configurable settings specifying corresponding functions to perform when the at least one RFID tag is outside of a range of the specified distance, the control logic of the user interface receiving one or more selections, via the settings, from the user;

wherein the RF interrogator is activated in response to activation of a vehicle security system through a function of a key fob, wherein the vehicle security system is actuatable by the key fob and comprises the vehicle control module and the at least one vehicle-embedded indicator, the interrogator comprising:

a control logic for transmitting the query RF signal to the at least one RFID tag;

a control logic for monitoring the at least one RFID tag for the reply RF signal;

a control logic for performing the one of the functions, based on the one or more user selections, upon determining the at least one RFID tag is moved out of the range of the specified distance, the functions including sending a trigger data signal to the vehicle alarm control module for activating the at least one indicator, sending a data signal configured to initiate a text message notification directed to a personal electronic device of the user, sending a data signal configured to initiate a recorded voice message directed to the personal electronic device of the user, and sending the trigger data signal and at least one of the data signals.

12. The vehicle of claim 11, wherein the RF interrogator includes a control logic for sending a trigger data signal to the vehicle alarm control module for activating the at least one vehicle-embedded indicator if the at least one RFID tag is moved out of range of the specified distance.

13. The vehicle of claim 11, wherein the selective wireless communication is based on one of the IEEE 802.15 standard, the IEEE 802.11 standard, and cellular signals.

14. The vehicle of claim 11, comprising a plurality of RFID tags, wherein a portion of the plurality of RFID tags are activated and a remainder of the plurality of RFID tags are deactivated.

15. The vehicle of claim 14, wherein the RF interrogator includes control logic for sending the trigger data signal to the vehicle alarm control module to activate the at least one vehicle-embedded indicator in the event at least one of the plurality of RFID tags that is activated is moved out of range of the specified distance, and wherein the RF interrogator includes control logic for not sending the trigger data signal to the vehicle alarm control module in the event at least one of the plurality of RFID tags that is deactivated is moved out of range of the specified distance.

16. The vehicle of claim 11, wherein the RF interrogator includes control logic for sending an initialization query RF signal to the at least one RFID tag and a control logic for monitoring the at least one RFID tag for an initialization reply RF signal, wherein the initialization query RF signal represents the first RF signal sent to the at least one RFID tag, and wherein receipt of the initialization reply signal confirms that the at least one RFID tag is within the specified distance of the RF interrogator.

17. A vehicle having an item detection system, comprising:

a wireless communication device in selective wireless communication with a personal electronic device;

at least one radio frequency identification ("RFID") tag that is configured for receiving a query RF signal and transmitting a reply RF signal upon receipt of the query RF signal, and wherein the at least one RFID tag is associated with a personal item that is affixed to an external portion of the vehicle;

at least one vehicle-embedded indicator for selectively emitting an alarm when activated;

a vehicle alarm control module that is in communication with the at least one vehicle-embedded indicator and the wireless communication device, the vehicle alarm control module including control logic for sending an activation data signal to the at least one vehicle-embedded indicator to selectively activate the at least one vehicle-embedded indicator; and a radio frequency ("RF") interrogator in communication with the vehicle alarm and located within a specified distance of the at least one RFID tag, the RF interrogator having a processor:

a user interface comprising control logic configured that provides user-configurable settings, the user-configurable settings specifying corresponding functions to perform when the at least one RFID tag is outside of a range of the specified distance, the control logic of the user interface receiving one or more selections, via the settings, from the user;

wherein the RF interrogator is selectively activated, independent from an activation of a vehicle security system, through a function of a key fob, wherein the vehicle security system is actuatable by the key fob and comprises the vehicle control module and the at least one vehicle-embedded indicator, the RF interrogator comprising:

a control logic for transmitting the query RF signal to the at least one RFID tag;

a control logic for monitoring the at least one RFID tag for the reply RF signal;

a control logic for performing the one of the functions, based on the user one or more selections, upon determining the at least one RFID tag is moved out of range of the specified distance, the functions including sending a trigger data signal to the vehicle alarm control module for activating the at least one vehicle-embedded indicator; sending a data to the wireless communication device for initiating a text message notification directed to a personal electronic device of the user, sending a data signal to the wireless communication device for initiating a recorded voice message directed to the personal electronic device of the user, and sending the trigger data signal and at least one of the data.

* * * * *